United States Patent [19]
Gary

[11] Patent Number: 5,589,151
[45] Date of Patent: Dec. 31, 1996

[54] PROCESS FOR THE PREPARATION OF HIGH-PURITY LIQUID NITROGEN

[75] Inventor: Daniel Gary, Versailles, France

[73] Assignee: L'Air Liquide Societe Anonyme Pour L'Etude et L'Exploitation des Procedes Georges Claude, Paris, France

[21] Appl. No.: 378,447

[22] Filed: Jan. 25, 1995

Related U.S. Application Data

[63] Continuation-in-part of Ser. No. 230,500, Apr. 20, 1994, abandoned.

[30] Foreign Application Priority Data

Dec. 31, 1993 [FR] France ................................ 93 15958
Dec. 22, 1994 [EP] European Pat. Off. ................ 94402

[51] Int. Cl.$^6$ ................................................ G01B 21/00
[52] U.S. Cl. ..................................................... 423/351
[58] Field of Search ........................................... 423/351

[56] References Cited

U.S. PATENT DOCUMENTS

| | | |
|---|---|---|
| 2,882,244 | 4/1959 | Milton . |
| 3,140,933 | 7/1964 | McKee . |
| 4,425,143 | 1/1984 | Nishizawa et al. . |
| 4,746,332 | 5/1988 | Tomomura et al. . |
| 4,869,883 | 9/1989 | Thorogood et al. . |
| 5,333,463 | 8/1994 | Garnier et al. . |

FOREIGN PATENT DOCUMENTS

| | | |
|---|---|---|
| 0454531 | 10/1991 | European Pat. Off. . |
| 2690357 | 10/1993 | France . |
| 1936049 | 1/1971 | Germany . |
| 4-77303 | 3/1992 | Japan . |
| 5-79754 | 3/1993 | Japan . |

OTHER PUBLICATIONS

Patent Abstracts of Japan, vol. 017, No. 410 (Jul. 1993),
Derwent Publication AN 90-078652 (Apr. 1990).

*Primary Examiner*—Wayne Langel
*Attorney, Agent, or Firm*—Oliff & Berridge

[57] ABSTRACT

In a process for the preparation of high-purity liquid nitrogen substantially free from at least one of the impurities hydrogen, carbon monoxide and oxygen, liquid nitrogen to be purified is placed in contact with an adsorbent and high-purity liquid nitrogen is recovered. A device for making use of this process includes a source of liquid nitrogen to be purified connected by a conduit to the entry of a reactor containing an adsorbent, the reactor exit being provided with a connecting conduit.

36 Claims, 4 Drawing Sheets

PROCESS FOR THE PREPARATION OF HIGH-PURITY LIQUID NITROGEN

This is a continuation-in-part of application Ser. No. 08/230,500, filed Apr. 20, 1994 abandoned.

FIELD OF THE INVENTION

The present invention relates to a process for the preparation of high-purity liquid nitrogen substantially free from at least one of the impurities hydrogen, carbon monoxide and oxygen, and to a device for making use of this process.

BACKGROUND

Liquid or gaseous nitrogen is conventionally prepared by cryogenic distillation of air, which is carried out in a cold box containing one or more distillation columns.

The nitrogen thus obtained exhibits a purity which is sufficient for most of its applications.

However, some activity sectors such as the electronics industry, especially for the manufacture of semiconductors or other components, the pharmaceutical industry, analysis or research, require nitrogen of higher purity.

Depending on the application in question, the nitrogen must, in particular, be substantially free from at least one of the impurities hydrogen, oxygen and carbon monoxide.

Maximum contents of these impurities of the order of a few ppb (parts per billion by volume) are then required.

The impurities hydrogen and carbon monoxide are conventionally removed from the air to be distilled or from the gaseous nitrogen resulting from the cryogenic distillation. To do this, purification processes have already been proposed, according to which said impurities can be reacted with a sufficient quantity of oxygen in the presence of a catalyst, to form water and carbon dioxide which are subsequently removed, for example by adsorption. Processes of this type are described, for example, in U.S. Pat. No. 4,869,883 and in Patent Applications EP-A-454,531 and FR-A-2,690,357.

Patent application JP-A-05/079754 describes a process for removing impure carbon dioxide, water and carbon monoxide from liquid nitrogen. According to this process, liquid nitrogen from a distillation column is introduced into an absorbing column, the liquid nitrogen then passes through said column and returns to the distillation column. The adsorbent used is a non-exchanged A type zeolite.

Another process for removing carbon monoxide from liquid nitrogen by adsorption with non exchanged zeolites is described in U.S. Pat. No. 5,333,463.

It has also been proposed to remove oxygen or carbon monoxide from cold gaseous nitrogen by adsorption. Such a process is described, for example, in U.S. Pat. No. 4,746,332.

It appears that the processes for the preparation of high-purity nitrogen are all—as far as the applicant is aware—performed on a gas, usually air or the nitrogen to be purified. Because of the large volumes of gas to be treated, the devices needed for making use of these processes are generally large in size, in particular when said gas consists of air.

Furthermore, with a view to reducing costs and investments, it is commonplace to store and to transport nitrogen in the liquid state. If it is desired to prepare high-purity liquid nitrogen, it is then necessary, in a first step, to purify the air to be distilled or gaseous nitrogen and then, in a second step, to liquefy the purified gaseous nitrogen.

However, the change from the gaseous state to the liquid state involves stages during which the nitrogen may be accidentally recontaminated by impurities, chiefly oxygen, and sometimes carbon monoxide and/or hydrogen. Furthermore, even when the liquefaction is carried out with great care, liquid nitrogen can still be recontaminated with said impurities when it is transferred from its storage or transportation site to another site of this type.

Moreover, a purification performed on a gas produces a large pressure drop. It would therefore be appropriate to perform this purification directly on liquid nitrogen to avoid this pressure drop.

SUMMARY OF THE INVENTION

A first object of the present invention is a process making it possible to treat liquid nitrogen directly in order to purify it.

A second object of the invention is a process for the purification of liquid nitrogen which does not require the use of a device which is costly and of large size.

A third object of the invention is a process for the purification of liquid nitrogen which can be carried out at any site for storing or transporting liquid nitrogen.

A fourth object of the invention is a device for the preparation of high-purity liquid nitrogen.

The invention therefore comprises a process for the preparation of high-purity liquid nitrogen substantially free from at least one of the impurities hydrogen, carbon monoxide and oxygen, characterized in that the liquid nitrogen to be purified is placed in contact with an adsorbent making it possible to adsorb at least one of said impurities and said high-purity liquid nitrogen is recovered, with the proviso that a process wherein the impurity is carbon monoxide and the adsorbent is a non-exchanged zeolite is excluded.

Indeed, it has been shown that the adsorption of carbon monoxide contained in liquid nitrogen by means of a non-exchanged zeolite only enables the partial removal of carbon monoxide. The liquid nitrogen recovered from such a process is not suitable, in particular, for the electronics industry.

The invention is now described in greater detail, with reference to the attached figures.

DESCRIPTION OF PREFERRED EMBODIMENTS

An adsorbent which is suitable for making use of the process according to the invention can be chosen from the group consisting of natural and synthetic zeolites and porous metal oxides. The natural zeolite is advantageously a mordenite and the synthetic zeolite is advantageously of the A, X or Y type.

These zeolites are well known and are described, for example, in U.S. Pat. No. 2,882,244 or in U.S. Pat. No. 3,140,933.

Within the context of the present invention, zeolites 4A, 5A and 10X are preferred.

These non-ion exchanged zeolites may be used for the adsorption of oxygen, or preferably hydrogen. However, as pointed out above, they are not suitable as such for carbon monoxide removal.

According to an advantageous aspect of the invention, the adsorbent may be exchanged with at least one metal ion, essentially when it consists of a zeolite. The ion exchange may be carried out in a conventional manner.

This exchange aims at substituting, at least partially, the cations contained within the natural or synthetic zeolite for at least one other chosen cation. Such exchanged zeolites are suitable for the adsorption of the above described impurities, including carbon monoxide.

The metal ion may be the ion of a metal chosen from the group consisting of lithium, an alkaline-earth metal such as calcium, barium or strontium, a transition metal such as zinc, iron or, preferably, copper or silver. The cupric ion is most preferred. The degree of exchange may vary as a function of the nature of the ion, but it is advantageously as high as possible. By way of examples, if the ion in question is lithium, the exchange ratio may be higher than 80%, more preferably higher than 90%; if the ion in question is the cupric ion, the exchange ratio may be higher than 90%, advantageously of the order of 100%. To reach a high exchange ratio, the adsorbent may be subjected to two or more successive exchange operations.

The most preferred adsorbents according to this invention are of porous metal oxide.

The term porous metal oxide is intended to mean both the oxides of a metal and mixed oxides containing oxides of a number of metals. The zeolites comprising $SiO_2$ units are not metal oxides within the meaning of the present invention.

Suitable metal oxides include oxides of transition metals, particularly those of columns IV B, V B, VI B, VIII B and I B of the Periodic Table and the atomic number of which falls between 22 and 79. Among the latter, preferred are the oxides of copper, nickel, manganese, silver and iron, taken alone or as mixed oxides. A metal oxide comprising a mixed copper manganese oxide such as the hopcalites, for example, are especially preferred. A hopcalite which is very suitable for making use of the process of the invention is of the type marketed by the company Prolabo France, comprising a mixture of manganese oxide, cupric oxide, cuprous oxide and manganese carbonate.

An adsorbent according to the invention may exhibit pores whose mean diameter is greater than 0.4 nm, preferably between 0.5 and 1 nm, and whose volume is greater than 0.1 cm$^3$/g, preferably between 0.15 and 0.5 cm$^3$/g. The specific surface area of the adsorbent according to the invention is generally greater than 150 m$^2$/g, preferably between 150 and 300 m$^2$/g when the adsorbent is a zeolite and between 500 and 800 m$^2$/g when the adsorbent is a porous metal oxide.

The adsorbent may be in the form of a powder or of small rods or, preferably, in bead form. The diameter of these beads may be between 1 and 5 mm.

The liquid nitrogen to be purified according to the process of the invention may contain less than 5 ppm (parts per million by volume) of each of said impurities, more generally from 0.15 to 2 ppm of each of said carbon monoxide and oxygen impurities and less than 50 ppb of said hydrogen impurities.

The content of each impurity may especially be a function of the process used to produce the liquid nitrogen to be purified.

The liquid nitrogen treated according to the process of the invention may now contain only very small proportions of each of said impurities. Thus, depending on the nature and the characteristics of the adsorbent used, it has been possible to prepare high-purity liquid nitrogen containing less than 10 ppb of hydrogen, less than 20 ppb or even less than 5 ppb of carbon monoxide and/or less than 25 ppb or even less than 5 ppb of oxygen. It should be noted that some adsorbents like those mentioned above are more selective for one impurity than for another. In this regard, it may be noted that metal oxides, in particular those of the hopcalite type, are more selective in relation to oxygen and carbon monoxide than in relation to hydrogen. In this case it may be advantageous to use two or more adsorbents in combination to obtain liquid nitrogen which is substantially free of each of said impurities.

Other processes for removing the impurity(ies) and which are not adsorbed by the adsorbent may be used. Thus, if the non-adsorbed impurity is hydrogen, it may be removed from liquid nitrogen by a classical means of distillation.

The various adsorbents thus used may be arranged in a single treatment zone or in separate treatment zones, each of these zones containing an adsorbent. Such a treatment zone may, for example, consist of a reactor.

However, liquid nitrogen which is substantially free from only one or two of said impurities may be suitable for some applications. An adsorbent which is selective for this impurity can then be used by itself.

The removal of the impurities may be carried out in contact with the adsorbent using chemisorption and/or physisorption.

The temperature of the liquid nitrogen to be purified is strictly lower than its boiling point. This temperature may be between $-196°$ C. and $-150°$ C. while the pressure of the liquid nitrogen to be purified may be between 1.5 and 25 bar, preferably between 3 and 15 bar. Naturally, the temperature and pressure are chosen in order to have the nitrogen in a liquid and not gaseous state.

The linear velocity of the liquid nitrogen through the adsorbent may be higher than $10^{-3}$ m/s; it is preferably between $10^{-3}$ and $5.10^{-2}$ m/s, preferably between $3.10^{-3}$ and $1.10^{-2}$ m/s.

The impurities oxygen and carbon monoxide are in the liquid state at the temperatures used.

According to a particularly preferred aspect of the process of the invention, the removal of the impurities is performed by adsorption outside the cold box in which the liquid nitrogen has been produced. It has, in fact, been found by the applicant that the adsorbent does not need to be kept at a low temperature, for example a temperature lower than the temperature of liquid nitrogen, to permit the preparation of high-purity liquid nitrogen.

After the removal of the impurities the adsorbent can be regenerated in a conventional manner by means of a flow of a regenerating gas. This gas may be passed through the adsorbent in the same direction as or, preferably, countercurrentwise to the liquid nitrogen to be purified. Said gas usually consists of gaseous nitrogen or a mixture of gaseous nitrogen and of a reducing gas such as a hydrocarbon, or preferably hydrogen.

Such a mixture may contain less than 5% by volume of reducing gas. The gaseous nitrogen used may be obtained by vaporization of the liquid nitrogen to be purified or which has been purified. The temperature of said regenerating gas may be between about 2° C. and 250° C. When the adsorbent is a zeolite this temperature is preferably close to ambient temperature (5° to 35° C.). When the adsorbent is a porous metal oxide this temperature is preferably between 150° and 250° C.

The adsorbent may be divided up into two separate treatment zones, mounted in parallel, one of these zones being regenerated while the other is in contact with the liquid nitrogen to be purified.

Before a first use of the adsorbent with a view to the removal of said impurities from liquid nitrogen, the adsorbent may be activated, especially to remove the traces of water which it contains.

To do this, the adsorbent can be subjected to a temperature of between 100° C. and 500° C. When the adsorbent is a zeolite, the activation may be carried out at a temperature of the order of 400° C., advantageously under nitrogen purging.

When the adsorbent is a porous metal oxide such as a hopcalite, the activation may be carried out at a temperature of between 150° C. and 300° C., preferably of the order of 250° C., advantageously under purging with an atmosphere consisting of nitrogen and hydrogen and/or carbon monoxide.

According to another aspect, the invention consists of a device for making use of the process described above. Such a device comprises a source of nitrogen to be purified containing at least one of the impurities hydrogen, carbon monoxide and oxygen and connected by a conduit to the entry of at least one reactor, each reactor containing at least one adsorbent making it possible to remove one or more of said impurities, the reactor exit being provided with a connecting conduit.

According to a very particularly advantageous aspect of the invention, said device comprises a source of liquid nitrogen arranged outside the cold box in which the liquid nitrogen to be purified is produced.

Figure 1:
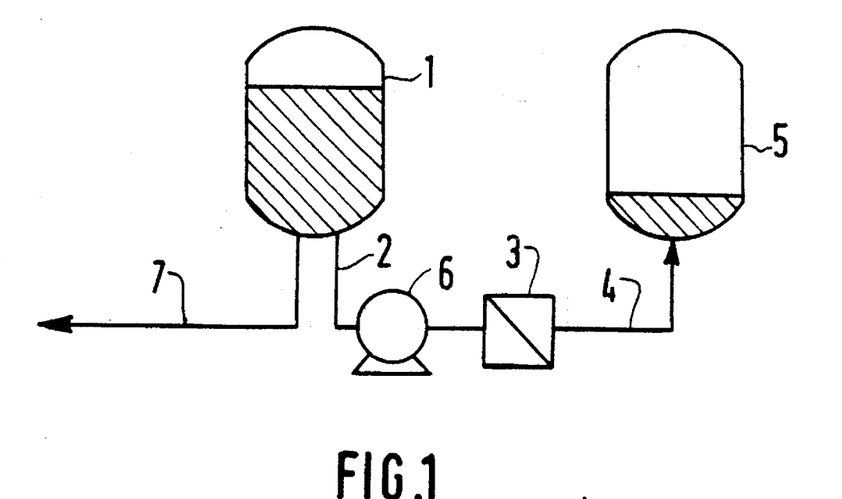
FIG. 1 shows a device for the removal of the impurities present in liquid nitrogen contained in a storage tank.

FIG. 1 shows a device according to the invention, comprising a source of liquid nitrogen to be purified 1 consisting of a stationary storage tank for liquid nitrogen. This tank is connected by a conduit 2, fitted with a pump 6, to the entry of a reactor 3 containing at least one adsorbent making it possible to remove one or more of said impurities.

The reactor exit 3 is provided with a connecting conduit 4 emerging in a storage tank 5 for purified liquid nitrogen.

The source of liquid nitrogen 1 is also provided with a conduit 7 for delivering impure nitrogen to the place where it is used (not shown).

The device shown in FIG. 1 therefore makes it possible to supply purified or unpurified liquid nitrogen as required and depending on the user's needs.

The device according to FIG. 1 adds only one reactor 3 and connecting means 2 and 4 to a plant already installed by a nitrogen user. Said device can therefore be easily installed on the latter's site.

Figure 2:
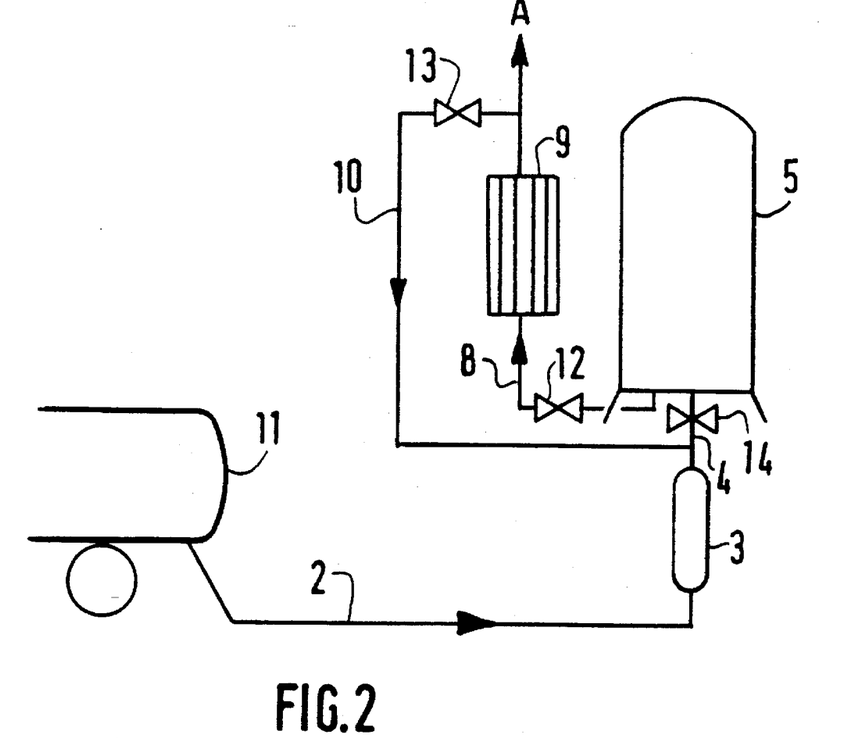
FIG. 2 shows a device for the removal of the impurities present in liquid nitrogen at a storage terminal.

FIG. 2 shows a device according to the invention, comprising a source of liquid nitrogen to be purified, consisting of a movable storage tank for liquid nitrogen 11, such as a truck tank.

The latter is connected by a conduit 2 to the entry of a reactor 3 containing at least one adsorbent making it possible to remove one or more of said impurities, the exit of said reactor being provided with a connecting conduit 4, fitted with a valve 14, emerging into a storage tank for purified liquid nitrogen 5.

This vessel is connected by a conduit 8, fitted with a valve 12, to an evaporator 9, itself connected by a conduit 10, fitted with a valve 13, to said connecting conduit 4.

The device shown in FIG. 2 makes it possible to purify the liquid nitrogen leaving the tank 11 immediately before it is stored in the storage tank 5.

In order to fill the storage tank 5 with nitrogen purified by placing impure nitrogen in contact with the adsorbent contained in the reactor 3, valve 14 is opened and valves 12 and 13 are closed. At the end of a filling operation, the conduit 2 is removed from the entry of the reactor 3, valve 14 is closed and valves 12 and 13 are opened. Liquid nitrogen from the storage tank is conveyed into the evaporator 9 to form gaseous nitrogen conveyed through the conduits 10 and 4 into the reactor 3. A stream of gaseous nitrogen is produced, purging the adsorbent present in the reactor, thus enabling it to be regenerated.

The device according to FIG. 2 also makes it possible to supply high-purity gaseous nitrogen to a user station. To this end, valves 13 and 14 are closed and valve 12 is opened. Liquid nitrogen is conveyed into the evaporator 9 and the high-purity gaseous nitrogen which is formed is conveyed towards its place of use in the direction of the arrow A.

Figure 3:
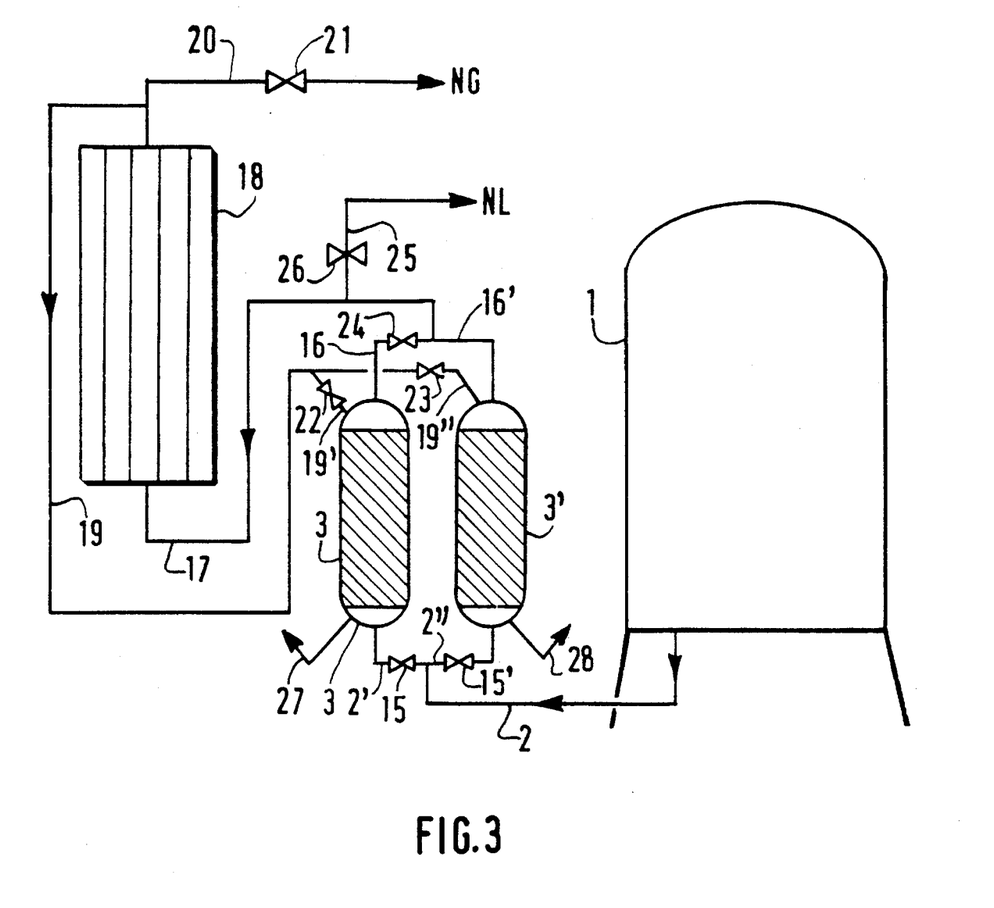
FIG. 3 shows a device for the removal of the impurities present in liquid nitrogen, said device comprising two adsorption reactors fitted in parallel.

The device shown in FIG. 3 comprises two reactors 3 and 3', fitted in parallel and connected to a stationary storage tank 1 by a conduit 2, which is divided into two branches 2' and 2". Branch 2' is provided with a valve 15 and branch 2" is provided with a valve 15'. Each reactor 3 and 3' is provided with a purge conduit, 27 and 28 respectively. The exit of each reactor 3 and 3' is equipped with a conduit 16 and 16', respectively, each emerging into a conduit 17 connected to the entry of an evaporator 18. The conduit 16 is provided with a branching conduit 25 fitted with a valve 26.

The exit of the evaporator 18 is equipped with a conduit 19 which is divided into two branches 19' and 19" emerging at the entry of each reactor, 3 and 3' respectively. Each of said branches 19' and 19" is fitted with a valve, 22 and 23 respectively. The conduit 19 includes a branching conduit 20 fitted with a valve 21.

In operation, one of the reactors 3 and 3' is used for the purification of impure nitrogen while the other is regenerated.

When the reactor 3 is in regeneration the valves 15, 21, 23 and 24 are closed and the valves 15', 22 and 26 are open. Liquid nitrogen is conveyed from the stationary storage tank 1 into the reactor 3', from which it comes out purified. A fraction of the purified liquid nitrogen is conveyed by conduits 16' and 25 towards its place of use (not shown). Another fraction of the purified liquid nitrogen is delivered by means of the conduits 16' and 17 into the evaporator 18.

The gaseous nitrogen formed in the evaporator 18 is conveyed by conduits 19 and then 19' into the reactor 3, so as to produce a countercurrent purging stream which makes it possible to regenerate the adsorbent. The gaseous nitrogen is discharged from the reactor 3 through the purge conduit 27. When the adsorbent in the reactor 3 is regenerated, the latter can in its turn be employed for the purification of liquid nitrogen, while the adsorbent in the reactor 3' is regenerated. To do this, valves 15', 21 and 22 are closed and valves 15, 23, 24 and 26 are opened.

When the user wishes to use high-purity gaseous nitrogen in addition to high-purity liquid nitrogen, valve 21 is opened. Gaseous nitrogen is then conveyed through the conduit 20 towards its place of use (not shown).

Depending on the demand, valve 21 can be open both when it is the adsorbent in reactor 3 or that in reactor 3' which is regenerated.

Figure 4:
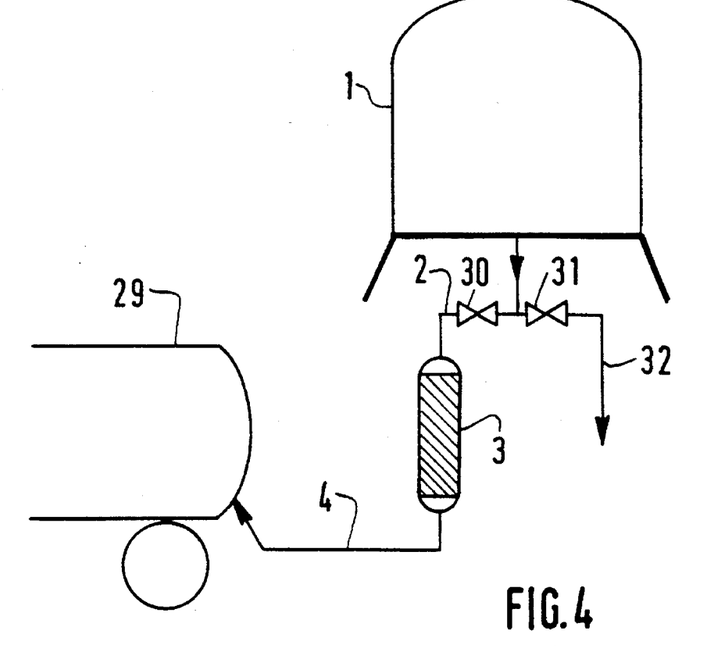
FIG. 4 shows a storage tank for liquid nitrogen, provided with a means for purification of the liquid nitrogen and connected to a tank for the transportation of this nitrogen.

The device shown in FIG. 4 comprises a stationary storage tank 1 for liquid nitrogen to be purified, connected by a conduit 2 fitted with a valve 30 to the entry of a reactor 3 containing an adsorbent as defined above. The exit of this reactor is connected by a conduit 4 to a movable storage tank 29 for purified liquid nitrogen. The conduit 2 is provided with a branching conduit 32 fitted with a valve 31.

Valve 30 is opened with a view to filling the movable storage tank 29. Impure liquid nitrogen is delivered from the storage tank 1 through the conduit 2 into the reactor 3.

Purified liquid nitrogen is then delivered from the reactor 3 into the movable tank 29.

Valve 31 may be open or closed. When it is open, simultaneously with the filling of the tank 29, it is possible to fill another movable or stationary tank (not shown) with impure liquid nitrogen.

Figure 5:
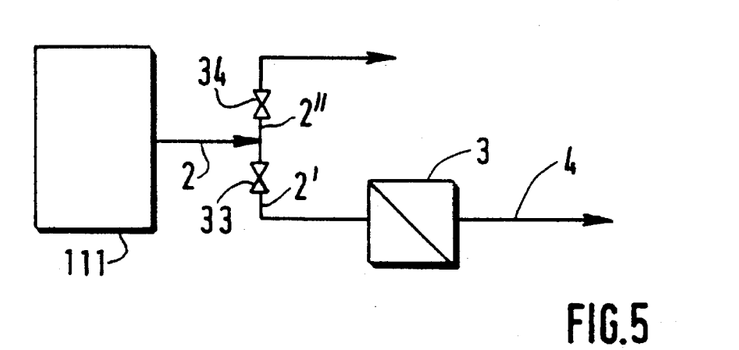
FIG. 5 shows a cold box for the separation of the gases of air and connected to a means for purifying liquid nitrogen.

The device shown in FIG. 5 shows a cold box 111 in which liquid nitrogen containing the impurities carbon monoxide, hydrogen and oxygen is produced. The cold box 111 is fitted with a conduit 2 which is divided into two conduits 2' and 2", each fitted with a valve, 33 and 34 respectively. Conduit 2' emerges at the entry of a reactor 3 provided with an adsorbent allowing the removal of at least one of said impurities. The exit of said reactor 3 is fitted with a connecting conduit 4.

Depending on whether the solenoid valve 33 or 34 is open, it is possible to produce high-purity nitrogen or nitrogen containing said impurities, as required, directly at the exit of the cold box 111.

Figure 6:
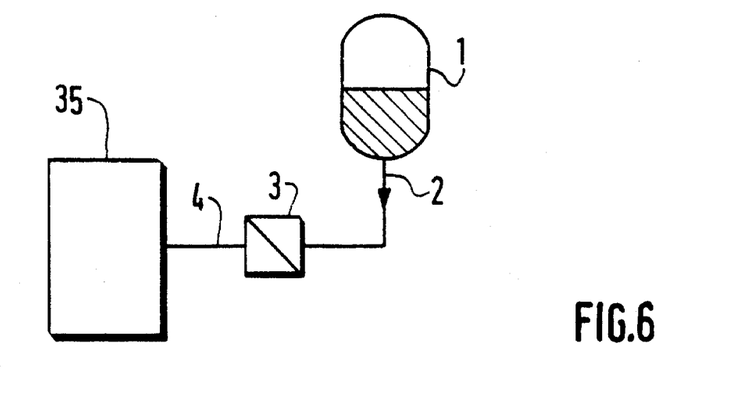
FIG. 6 shows a unit for separating the gases of air, operating with a liquid assist of high-purity liquid nitrogen.

FIG. 6 shows a unit for separating the gases of air, operating with a liquid assist of high-purity liquid nitrogen. This device comprises a source of liquid nitrogen to be purified 1 connected by a conduit 2 to the entry of a reactor 3 containing an adsorbent for removing the impurities carbon monoxide, hydrogen and oxygen. The exit of the reactor 3 is fitted with a connecting conduit 4 emerging into a cold box 35. The latter may especially comprise an APSA distillation column.

Figure 7:
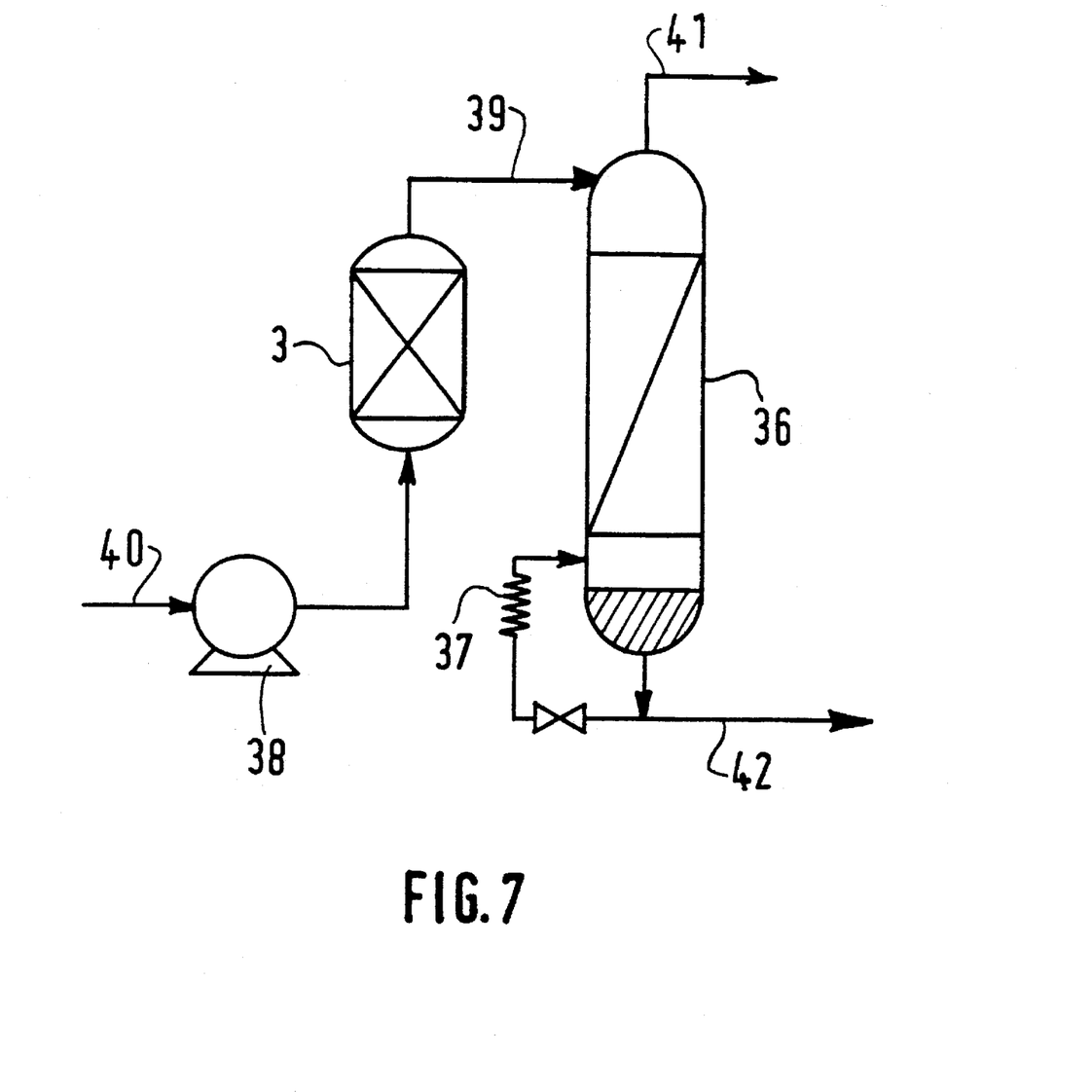
FIG. 7 shows a device for removing oxygen and carbon monoxide by adsorption, associated with a distillation column for hydrogen removal.

FIG. 7 shows a device according to this invention, combining (i) a reactor 3 filled with an adsorbent such as a hopcalite, which is more selective for oxygen and carbon monoxide than for hydrogen, with (ii) a distillation column 36, for the separation of liquid hydrogen from liquid nitrogen.

The distillation column 36 is linked to the reactor 3 by means of a duct 36. The distillation column 36 is also provided with a reboiler 37, enabling it to vaporize nitrogen from the liquid nitrogen coming out of said column 36.

Liquid nitrogen to be purified is conveyed by duct 40, if necessary by means of pump 38, to reactor 3. The carbon monoxide and hydrogen impurities are adsorbed onto the adsorbent which fills reactor 3.

At the exit of reactor 3, the liquid nitrogen is conveyed by duct 30 into the high part of the distillation column 36. The liquid nitrogen is recovered at the exit of said column 36 and conveyed to a liquid nitrogen storage tank (not shown) by means of duct 42.

Part of the purified liquid nitrogen that is recovered at the exit to column, is conducted to the reboiler 37 to form gaseous nitrogen. The latter is introduced in the low part of said column, in countercurrent to the liquid nitrogen coming from duct 40.

The hydrogen is evacuated in the direction of arrow 41.

The examples below are intended to illustrate the present invention. They have been produced by using the device according to the invention, shown in FIG. 1. The reactor employed was 32 mm in diameter and 500 mm in height.

The impurities hydrogen and carbon monoxide were measured every two minutes by means of an RGA 3 chromatograph marketed by the company Trace Analytical. The impurity oxygen was measured continuously by means of an OSK analyser, marketed by the company Osaka Sanso Kogyo Ltd. The detection threshold of the RGA 3 chromatograph is less than 10 ppb for hydrogen; it is 2 ppb for carbon monoxide. The detection threshold of the OSK analyser is 2 ppb for oxygen.

EXAMPLE 1

The reactor is filled with a zeolite 5A marketed by the company Bayer. These zeolites are in the form of beads whose diameter is between 1.6 mm and 3.5 mm. The zeolite is activated by treatment at 400° C. under gaseous nitrogen for 10 hours.

The liquid nitrogen to be purified contained:

| | |
|---|---|
| hydrogen: | 50 ppb |
| carbon monoxide: | 700 ppb |
| oxygen: | 150 ppb. |

The temperature of the liquid nitrogen is −170° C. and its pressure is 10 bar.

The reactor is fully insulated to keep this temperature constant.

The contents of impurities present in the liquid nitrogen as it left the reactor are measured for 30 minutes.

During this period 30 ppb of carbon monoxide are detected; hydrogen is not detected.

The oxygen content of the liquid nitrogen treated is higher than 120 ppb.

It may be noted that a non-exchanged A type zeolite only enables the partial removal of carbon monoxide. However, this adsorbent enables good hydrogen removal.

EXAMPLE 2

A zeolite 5A exchanged with copper is prepared by performing two successive exchanges, each carried out as follows:

Into a 4-liter round bottom flask supporting a condenser are introduced 500 g of zeolites according to condenser are introduced 500 g of zeolites according to Example 1, followed by 2 liters of a molar solution of $CuCl_2$, which are heated at 60° for 2 hours.

The solid is filtered off and washed with demineralized water to neutrality; it is then dried overnight at 80° C.

The zeolite obtained is exchanged with copper with an exchange ratio close to 100%.

This zeolite is activated by purging with gaseous nitrogen at 400° C.

Liquid nitrogen exhibiting the characteristics shown in Example 1 is then placed in contact with this zeolite.

Measurements are performed for 60 minutes on the purified liquid nitrogen obtained at the reactor exit.

Hydrogen and carbon monoxide could not be detected; the oxygen content is higher than 120 ppb.

EXAMPLE 3

350 g of zeolite Y, in the form of beads from 1.6 to 3.5 mm in diameter are exchanged by means of a solution of 91 g of silver nitrate in 735 ml of distilled water. The exchange ratio is 80%. Zeolite Y thus prepared is placed in the reactor. The zeolite is activated as shown in Example 1

The zeolite Y exchanged with silver is placed in contact with liquid nitrogen exhibiting the characteristics shown in Example 1. Measurements are performed for 30 minutes on the liquid nitrogen collected at the reactor exit. The liquid nitrogen exhibited undetected contents of hydrogen and carbon monoxide and an oxygen content of 125 ppb.

EXAMPLE 4

500 g of mordenite in the form of small rods are arranged in a 1-liter round bottom flask supporting a condenser and placed in an enclosure thermosrated at 60° C. 250 ml of a silver nitrate solution obtained by dissolving 133 g of silver nitrate in distilled water are then introduced into the flask.

Reaction is allowed to take place for 3 hours. After cooling, the zeolite is filtered off on sintered glass and rinsed with distilled water until the pH of the latest washing filtrate is neutral. The sample is dried in the oven overnight at 80° C.

The zeolite is activated for 2 hours at 450° C. under a nitrogen atmosphere with continuous purging. The zeolite is then arranged in the reactor and is placed in contact with liquid nitrogen to be purified, containing 200 ppb of oxygen, 50 ppb of hydrogen and 700 ppb of carbon monoxide.

The liquid nitrogen is at 10 bar and at a temperature of −170° C.

The liquid nitrogen is conveyed through the reactor, collected at its exit, and its impurities are measured for 60 minutes. The liquid nitrogen contained 125 ppb of oxygen and non-detectable contents of hydrogen and carbon monoxide.

EXAMPLE 5

A hopcalite marketed by the company Prolabo, which exhibits the following characteristics, is arranged in the reactor:

| particle size | 1 to 3.3 mm |
|---|---|
| apparent density | 1.2 |
| composition: | |
| $MnO_2$ % | 57 |
| $Cu_2O$ and $CuO$ % | 13 |
| $MnCO_3$ % | 30 |

The hopcalite is arranged in the reactor after having been activated with a gaseous mixture containing of nitrogen and 5% of hydrogen (by volume), at 250° C.

The treated liquid nitrogen is identical with that of Example 4.

The contents of impurities in the liquid nitrogen leaving the reactor are measured for 60 minutes. It was found that hydrogen is not removed and that the carbon monoxide and oxygen contents are not detected.

What is claimed is:

1. Process for the preparation of high purity liquid nitrogen substantially free from at least one impurity selected from the group consisting of hydrogen, carbon monoxide and oxygen, comprising placing liquid nitrogen to be purified in contact with at least one adsorbent selected from the group consisting of non-ion exchanged zeolites, zeolites exchanged with at least one ion of a transition metal, and porous metal oxides, said adsorbent adsorbing at least one said impurity, and recovering said high purity liquid nitrogen, with the proviso that a process wherein the at least one adsorbent is a non-ion exchanged zeolite and the at least one impurity to be adsorbed is carbon monoxide is excluded.

2. Process according to claim 1, wherein the adsorbent is selected from the group consisting of porous metal oxides and zeolites exchanged with at least one ion of a transition metal.

3. Process according to claim 1, wherein the adsorbent is a zeolite exchanged with at least one ion of a transition metal exchanged with at least one ion derived from transition metals.

4. Process according to claim 3, wherein said zeolite exchanged with at least one ion of a transition metal is selected from the group consisting of ion-exchanged zeolites 4A, ion-exchanged zeolites 5A and ion-exchanged zeolites 10X.

5. Process according to claim 3, wherein said transition metal comprises zinc, iron, silver or copper.

6. Process according to claim 3, wherein said ion exchanged zeolite is exchanged with a cupric ion.

7. Process according to claim 1, wherein the adsorbent is a porous metal oxide.

8. Process according to claim 7, wherein the porous metal oxide comprises at least one transition metal oxide.

9. Process according to claim 8, wherein said porous metal oxide comprises a mixed copper manganese oxide.

10. Process according to claim 9, wherein said mixed copper manganese oxide is hopcalite.

11. Process according to one of claim 1, wherein the adsorbent has a mean pore diameter greater than or equal to 0.4 nm.

12. Process according to claim 11, wherein said adsorbent has a mean pore diameter between 0.5 and 1 nm.

13. Process according to claim 1, wherein the impurity consists essentially of carbon monoxide and oxygen.

14. Process according to claim 1, wherein the adsorption of the impurity is carried out outside a cold box in which the liquid nitrogen has been produced.

15. Process according to claim 1, wherein said adsorbent is regenerated after adsorption of the impurity.

16. Process according to claim 1, wherein said adsorbent is divided up into two separate treatment zones mounted in parallel, one of the zones being regenerated while the other zone is in contact with the liquid nitrogen to be purified.

17. Process according to claim 1, wherein said liquid nitrogen to be purified is at a pressure of between 1.5 bar and 25 bar.

18. Process according to claim 17, wherein said liquid nitrogen to be purified is at a pressure of between 3 bar and 15 bar.

19. Process according to claim 1, wherein the linear velocity of the liquid nitrogen to be purified through the adsorbent is higher than $10^{-3}$ m/s.

20. Process according to claim 19, wherein the linear velocity of the liquid nitrogen to be purified through the adsorbent is between $10^{-3}$ and $5 \cdot 10^{-2}$ m/s.

21. Process according to claim 1, wherein said zeolites exchanged with at least one ion of a transition metal are selected from the group consisting of ion-exchanged zeolites 4A, ion-exchanged zeolites 5A and ion-exchanged zeolites 10X.

22. Process according to claim 2, wherein said zeolites exchanged with at least one ion of a transition metal are selected from the group consisting of ion-exchanged zeolites 4A, ion-exchanged zeolites 5A and ion-exchanged zeolites 10X.

23. Process for the preparation of high purity liquid nitrogen substantially free from at least one impurity selected from the group consisting of hydrogen and oxygen, comprising placing liquid nitrogen to be purified in contact with at least one adsorbent selected from the group consisting of porous metal oxides and zeolites exchanged with at least one ion of a transition metal, said adsorbent adsorbing at least one said impurity and recovering said high purity liquid nitrogen.

24. Process according to claim 23, wherein said porous metal oxide comprises at least one transition metal oxide.

25. Process according to claim 24, wherein said porous metal oxide comprises a mixed copper manganese oxide.

26. Process according to claim 25, wherein said mixed copper manganese oxide is hopcalite.

27. Process according to claim 23, wherein said adsorbent has a mean pore diameter greater than or equal to 0.4 nm.

28. Process according to claim 27, wherein said adsorbent has a mean pore diameter between 0.5 and 1 nm.

29. Process according to claim 24, wherein the impurity consists essentially of oxygen.

30. Process according to claim 23, wherein the adsorption of the impurity is carried out outside a cold box in which the liquid nitrogen has been produced.

31. Process according to claim 23, wherein said adsorbent is regenerated after adsorption of the impurity.

32. Process according to claim 23, wherein said adsorbent is divided up into two separate treatment zones mounted in parallel, one of the zones being regenerated while the other zone is in contact with the liquid nitrogen to be purified.

33. Process according to claim 23, wherein said liquid nitrogen to be purified is at a pressure of between 1.5 bar and 25 bar.

34. Process according to claim 33, wherein said liquid nitrogen to be purified is at a pressure of between 3 bar and 15 bar.

35. Process according to claim 23, wherein the linear velocity of the liquid nitrogen to be purified through the adsorbent is higher than $10^{-3}$ m/s.

36. Process according to claim 23, wherein said zeolites exchanged with at least one ion of a transition metal are selected from the group consisting of ion-exchanged zeolites 4A, ion-exchanged zeolites 5A and ion-exchanged zeolites 10X.

* * * * *